UNITED STATES PATENT OFFICE.

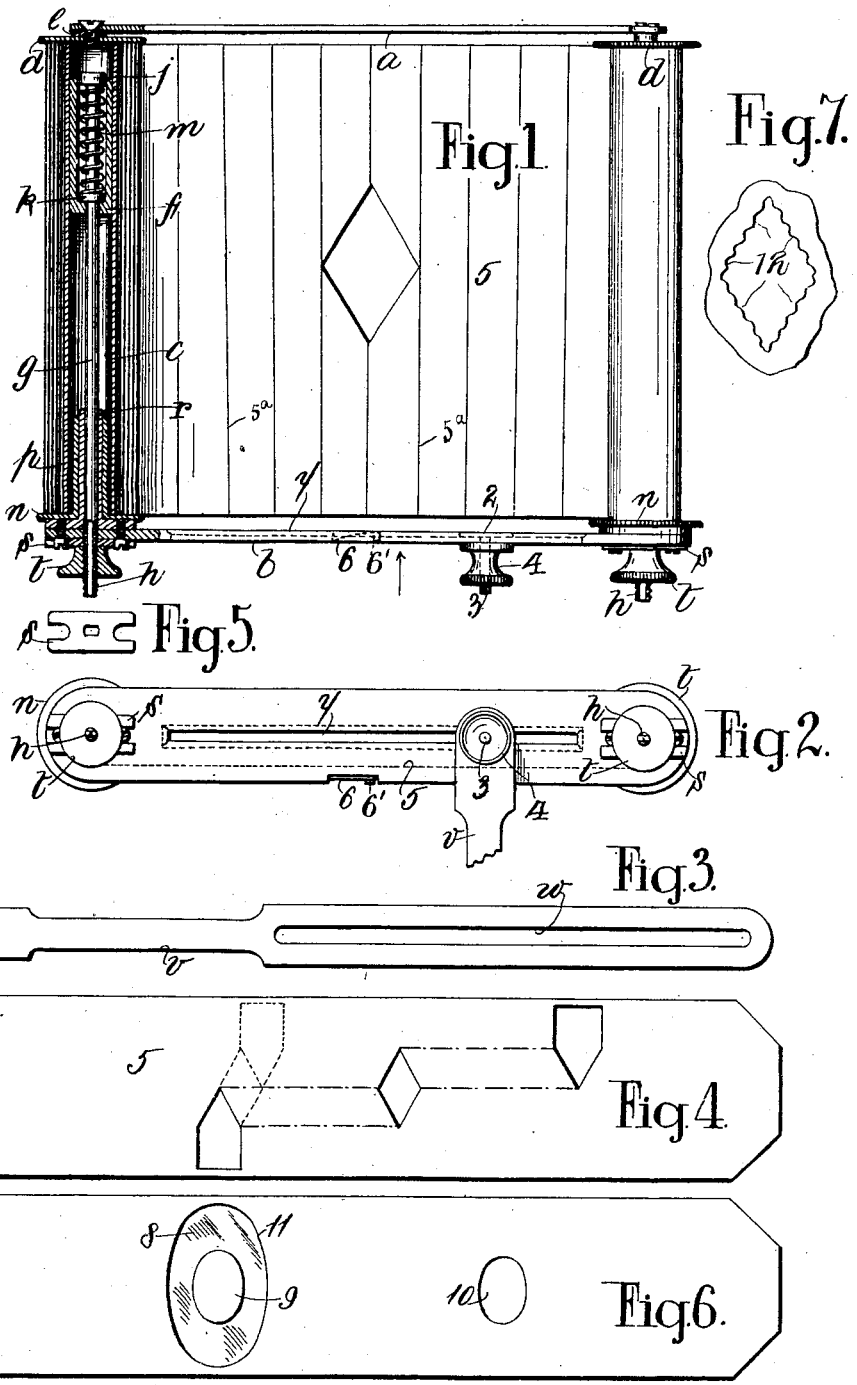

WILLIAM BOYD HENDERSON, OF LONDON, ENGLAND.

DEVICE TO ENABLE PHOTOGRAPHIC PLATES TO BE EXPOSED IN SECTIONS.

No. 864,643.　　　Specification of Letters Patent.　　　Patented Aug. 27, 1907.

Application filed October 13, 1906. Serial No. 338,847.

*To all whom it may concern:*

Be it known that I, WILLIAM BOYD HENDERSON, a subject of the King of England, residing at 108 Westbourne Grove, London, England, have invented certain new and useful Improvements in Devices to Enable Photographic Plates to be Exposed in Sections; and I do hereby declare the following to be a full, clear, and exact description of the invention, such as will enable others skilled in the art to which it appertains to make and use the same.

This invention relates to photographic cameras and has for its object improvements in shutters or screens for exposing photographic plates in sections, one or more at a time.

A rigid frame having two rollers fixed, one at the top and bottom, or one on either side is rigidly fixed in front of or behind the lens of the camera. A strip of opaque cloth, paper, or other opaque flexible material is divided into sections by lines drawn or printed across it. Any number of sections may be used, the various sections being of approximately the same size or length. These sections are suitably perforated with one or more holes of suitable shape and size, and so registered in position that when an exposure of the plate has been made on one part of the plate it can be followed up until the whole of the plate will have been exposed. The end of the strip of opaque cloth, paper, or other flexible material is fastened in a slot in the roller, or by any other means to each of the aforementioned rollers, and the strip wound on one of them. The rollers are furnished with a flange at either end to insure the strip rolling evenly thereon. The other end of the strip being fastened to the other roller enables it to be wound from one roller to the other. An indicator is fixed to the rigid frame or may form a part thereof, to enable the sections or perforations on the strip to be registered in position by bringing the dividing lines into alinement with the indicator while winding the strip from one roller to the other. The distance between the rollers affords room for only one, or several sections of flexible strip to be in use at a time, each containing one or more perforations, the other sections being wound on one or other of the rollers. If the sections are correctly registered in position and used one after the other the perforations in the same will be so placed and be of such a shape and size that the whole of the photographic plate or film will have been exposed.

The position of the device in regard to the camera should be out of the plane of focus of the lens so that the edges of the perforations which may be serrated will not be clearly defined on the photographic plate or film.

To enable the said exposure to be given to each part of the photographic plate or film any well known device may be used, such as a time shutter or the like. Where a closed camera is used, and where no focusing screen is available, a view finder may be temporarily fixed to the front of the lens by any means so that its center is in alinement with that of the lens. It is found that in some cases it is advisable to cut several openings or perforations in the section of the paper between the two rollers, in which case lines or other indications have to be made upon the paper, in order to determine the exact position of the sitter while focusing.

It is understood that the screen blocks the whole of the light out from the plate except that which passes through the perforations. And in order that my said invention may be better understood, I will now proceed to describe the same with reference to the drawing accompanying this specification, which shows one form of device for attachment to a camera for the purpose of carrying out my invention.

Figure 1 is a front elevation, partly in section, of the device complete with a roll of paper or the like provided with suitable perforations attached thereto; Fig. 2 is a plan looking in the direction of the arrow Fig. 1; Figs. 3 to 7 show details hereinafter referred to.

The same letters and numerals of reference are employed to denote the same parts in all the views.

The frame is composed of two flat strips $a$ and $b$, with two rollers of special construction mounted between them. These rollers being of identical construction, it will be sufficient to describe one of them in detail.

Referring to Fig. 1, $c$ is a hollow cylinder or tube provided with a milled flange $d$ suitably attached thereto. The center of the milled flange $d$ has a hole $e$, into which a set screw, passing through a perforation in the strip $b$, takes. The inside of the tube $c$ has a projecting shelf therein at $f$, or this shelf may be constituted by having a wooden or other suitable tube within the tube $c$.

$g$ is a rod, one end $h$ of which is screwed and also flattened, the other end $j$ has a button or knob thereon. Between this knob and a washer $k$ sliding on the rod is a helical spring $m$, which bears against the knob $j$ and the washer $k$. This washer $k$ rests against the shelf $f$.

$n$ is another flange at the opposite end of the roller $c$ to the flange $d$, and also attached to the roller $c$. Within the tube $c$ is a small piece of tubing $p$ attached to the flange $n$ so as to form a sleeve in which another piece of tube $r$ attached to the strip $b$ works. The rod $g$ passes through this sleeve $r$.

$s$ is a small plate attached to the strip $b$, which is shown in detail at Fig. 5, and has a rectangular slot therein, through which the flattened end of the rod $g$ passes, to prevent the rotation of the said rod. The plate s may be dispensed with in some cases, and the rectangular slot to prevent the rotation of the rod g may be provided in the strip b.

t is a milled head which screws on to the end h of the said rod g. The object of this construction is to enable the pressure on the two rollers to be regulated, so that although they are not entirely prevented from turning, any suitable amount of friction may be put upon them by tightening the milled head t, thus drawing down the rod g against the pressure of the spring m and forcing the flange n against the strip b or plate attached thereto. The strip b is provided with a long slot 7.

v is a rod, shown clearly at Fig. 3, which is provided with a long slot w, by means of which and a suitable screw it may be attached to the base of the camera or to some other suitable portion of the tripod or camera fittings. This rod v is provided with a hole z. The frame carrying the rollers is attached to this rod by a screw clamp, shown at Fig. 1. This consists of a plate 2, sliding in the groove 7, which plate is beveled to correspond to a bevel on the inner sides of the groove to prevent the said piece rotating. The plate 2 has attached thereto a screw pin 3 and screwing on to this pin is a milled nut 4. The pin 3 is passed through the hole z in the rod u and the whole is clamped in position by screwing down the nut 4. The frame may be adjusted laterally to any required position by slackening the nut 4, and drawing the clamping device along the strip b.

5 is a band of paper or other suitable material provided with perforations. These perforations are made in such a way that the light coming from the object photographed passes through one or more of them at a time and in such a way that as the band 5 is wound intermittently from one roller to the other all parts of the plate will be exposed without any portion being doubly exposed.

6 is a pointer pivoted as at 6', which can be turned to a vertical position when required to indicate the exact position of lines 5ª or the like drawn on the band of paper or other material. The ends of the band 5 may be narrowed or pointed to fit into suitable slots in the rollers c, to hold the band in position. In utilizing this form of the device the frame carrying the rollers is clamped in position at such a distance in front of the lens that the edges of the perforations, when shown on the focusing screen, shall not be too sharply defined, in order to avoid sharp lines of junction between the various sections. The sitter, or that portion of his figure which it is desired to photograph, is focused and an exposure is made and a photograph taken of this portion. Then the paper or other material 5 on which are the perforations is moved by turning the rollers by means of the milled flanges d, with the thumb and finger until the perforations allow the light to reach another portion of the plate. The sitter is then focused in a similar way upon this other portion of the plate and another picture taken and any number of requisite exposures may be made. In this way the photograph can be taken of a person apparently shaking hands with himself, and various curious combinations of negatives can be obtained.

It will be seen by examining Fig. 4 that the apertures may be made to cover the whole plate. The perforations in the particular case shown are three in number and when the band is moved so that they occupy contiguous positions, as shown dotted, a strip, extending across the plate, will be exposed in three exposures.

I propose to employ any suitable device for regulating the exposures in such a way that the same exposures are given to each section.

At Fig. 6 is shown a modified form of band 5 for use with my apparatus. In this case the band is made of paper or other suitable material as before provided with an oval perforation 11. This perforation has suitably attached behind it a film of transparent xylonite 8 or other suitable flexible material.

9 is an opaque mask placed at the center of this oval aperture and cemented or otherwise suitably fastened to the xylonite piece 8.

10 is an aperture in the band of the same size as the mask 9.

In using this form of the device the portrait of the sitter may be taken through the aperture 10 and the band may then be moved along so that the mask 9 obscures the portion of the plate already exposed and on a fresh exposure the portions seen through the film 8 are exposed and this produces the effect of vignette at two operations instead of requiring at least three as would be the case with other forms of my bands.

It is of course obvious that the shape of the aperture containing the xylonite film and also the shape of the mask 9 may be varied to suit requirements.

Fig. 7 shows in detail a modified form of perforation, 12 indicating serrated edges, which form also produces the effect of vignette.

In place of fixing the apparatus in front of the lens it may be fixed inside the camera, at some little distance from the focal plane, so that the edges of the perforations may not be too sharply defined upon the plate. In this case the apparatus is attached by means of a suitable bracket which holds the screw 3 and attaches the device on to the edge of the camera or a suitable frame to fit the back of the camera.

In order to actuate the perforated band it is simply necessary to remove the plate holder, readjust the band as required, focus again and then reinsert the plate holder in the ordinary way.

In the case of a hand camera where no focusing screen can be utilized, I provide a view finder placed temporarily in front of and in alinement with the lens for indicating the position of the sitter.

What I claim and desire to secure by Letters Patent of the United States of America, is:—

1. A device for attachment to or insertion in a camera, in combination, a frame provided with rollers, an indicator carried by said frame, a band attached to said rollers, said band being provided with perforations arranged in such a way that as the band is moved intermittently from one roller to the other all portions of a plate or film may be exposed, and means for regulating pressure on said band while the exposure is being made, substantially as described.

2. A device for attachment to or insertion in a camera, in combination, a frame provided with rollers, an attaching arm adjustably mounted on said frame, a band attached to said rollers, said band being provided with perforations arranged in such a way that as the band is moved intermittently from one roller to the other all portions of the plate or film may be exposed, and means for regulating pressure on said band, substantially as described.

3. A device for attachment to or insertion in a camera, in combination, a frame provided with rollers, an indicator carried by said frame, an attaching arm adjustably mounted on said frame, a band attached to said rollers, said band being provided with perforations arranged in such a way that as the band is moved intermittently from one roller to the other all portions of a plate or film may be exposed, and means adjacent each roller for regulating pressure on said band, substantially as described.

In testimony whereof, I affix my signature, in presence of two witnesses.

WILLIAM BOYD HENDERSON.

Witnesses:
LILY SIMMONDS,
A. E. VIDAL.